(12) United States Patent
Hewitt

(10) Patent No.: US 7,587,940 B2
(45) Date of Patent: Sep. 15, 2009

(54) LIQUID LEVEL SENSOR WITH FLOW RESTRICTOR

(76) Inventor: John T. Hewitt, 5492 Bolsa Ave., Huntington Beach, CA (US) 92649

( * ) Notice: Subject to any disclaimer, the term of this patent is extended or adjusted under 35 U.S.C. 154(b) by 0 days.

(21) Appl. No.: 11/951,865

(22) Filed: Dec. 6, 2007

(65) Prior Publication Data

US 2008/0271526 A1 Nov. 6, 2008

(51) Int. Cl.
*G01F 23/00* (2006.01)
(52) U.S. Cl. .................................... 73/290 R; 73/299
(58) Field of Classification Search ............. 73/290 R
See application file for complete search history.

(56) References Cited

U.S. PATENT DOCUMENTS

| | | | |
|---|---|---|---|
| 1,391,077 | A | 9/1921 | Richter |
| 1,508,969 | A | 9/1924 | Guichard |
| 1,661,995 | A | 3/1928 | Brown |
| 1,946,175 | A | 2/1934 | Murphy et al. |
| 2,382,695 | A | 8/1945 | De Giers |
| 2,455,200 | A * | 11/1948 | Wallace ............. 73/299 |
| 2,989,870 | A | 6/1961 | Stahl |
| 3,290,939 | A | 12/1966 | Beck et al |
| 3,664,365 | A | 5/1972 | Ralet et al. |
| 3,688,577 | A | 9/1972 | Murphy et al. |
| 3,782,323 | A | 1/1974 | Jones |
| 3,956,937 | A | 5/1976 | Lawford et al. |
| 4,111,044 | A | 9/1978 | McClure |
| 4,289,027 | A * | 9/1981 | Gleaves et al. ........ 73/299 |
| 4,417,232 | A | 11/1983 | Tewfik |
| 4,504,819 | A | 3/1985 | Hosoya |
| 4,541,285 | A | 9/1985 | Hafner |
| 4,549,164 | A | 10/1985 | Tewfik |
| 4,735,100 | A | 4/1988 | Hajto |
| 6,040,776 | A | 3/2000 | Glover et al. |
| 6,703,635 | B2 | 3/2004 | Yahsiro et al. |
| 2005/0001193 | A1 * | 1/2005 | Droppleman ............. 251/144 |
| 2006/0053879 | A1 | 3/2006 | Reinis et al. |

FOREIGN PATENT DOCUMENTS

| | | |
|---|---|---|
| EP | 0045011 | 2/1982 |
| EP | 1413443 | 4/2004 |
| GB | 556268 | 9/1943 |

OTHER PUBLICATIONS

Notification of Transmittal of the International Search Report and the Written Opinion of the International Searching Authority, or the Declaration—Jun. 18, 2008—PCT/US2008/002767.
Office Action mailed Apr. 25, 2008 regarding parent U.S. Appl. No. 11/743,111.

* cited by examiner

*Primary Examiner*—Hezron Williams
*Assistant Examiner*—Mark Shabman
(74) *Attorney, Agent, or Firm*—Larry K. Roberts

(57) ABSTRACT

A liquid level sensor system actuated by a column pressure includes a hollow member having a distal open end adapted to be positioned into a liquid reservoir to a depth below a liquid surface level, and a sensor head unit. The sensor head unit is responsive to the column pressure to provide an indication of a liquid level in the reservoir. A flow restrictor is positioned to dampen instantaneous differential column pressure changes presented to the bellows member while permitting steady state column pressure to be communicated to the bellows member.

24 Claims, 6 Drawing Sheets

US 7,587,940 B2

LIQUID LEVEL SENSOR WITH FLOW RESTRICTOR

CROSS-REFERENCE TO RELATED APPLICATION

This application claims priority from application Ser. No. 11/743,111, filed May 1, 2007, the entire contents of which are incorporated herein by this reference.

BACKGROUND

Determining or estimating the level of a liquid in a reservoir can be difficult, and subject to error. Conventional arrangements include fuel tank sensors which utilize a float device which floats on a liquid surface, a measuring stick which is inserted into a tank to contact its bottom and then removed for observation of a liquid level on the stick, or even a sight glass.

BRIEF DESCRIPTION OF THE DRAWINGS

Features and advantages of the disclosure will readily be appreciated by persons skilled in the art from the following detailed description when read in conjunction with the drawing wherein.

DETAILED DESCRIPTION

Figure 2:
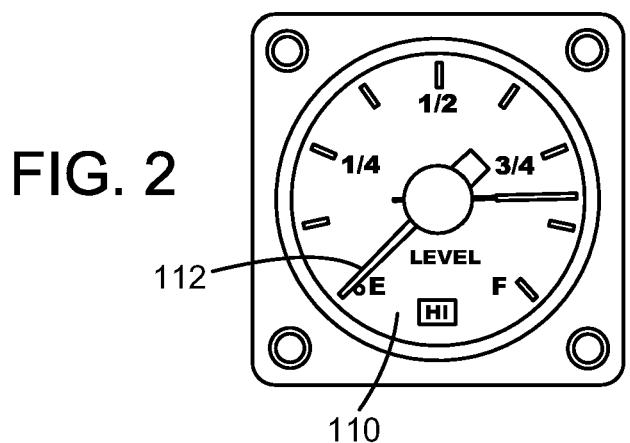
FIG. 2 is a front view of an exemplary embodiment of a display face of an indicator for the system of FIG. 1.

In the following detailed description and in the several figures of the drawing, like elements are identified with like reference numerals. The figures are not to scale, and relative feature sizes may be exaggerated for illustrative purposes.

An exemplary embodiment of a non-electrically powered liquid level sensor system 50 is depicted in FIGS. 1-5. The system 50 may be used to sense and provide an indication of the level 14 of a liquid 12 in a reservoir or tank 10. In one exemplary embodiment, the liquid 12 may be lubricating oil in a crankcase. The system may be used to sense the level of other liquids in a tank or reservoir, including, by way of example only, water, gasoline or other liquid fuel in a fuel tank of a vehicle or airplane, gasoline in an underground storage tank at a fuel station.

In the exemplary embodiment of FIGS. 1-5, the system 50 includes a hollow sensing tube 60 which is inserted into the reservoir 10. The tube has a distal open end 62 which is positioned at a depth in the reservoir at or below the lowest level to be sensed by the system 50. The open end 62 of the tube allows liquid to enter the tube to an equilibrium level 16 which is determined by the volume of liquid in the reservoir 10, and characteristics of the system 50. Entry of the liquid into the tube end 62 creates a column air pressure within the tube chamber 66. In an exemplary embodiment, the column air pressure is variable as the level 14 of the liquid varies. The higher the level 14, the higher will be the corresponding level 16 of liquid within the tube and the resulting column pressure. Conversely, as the level 14 decreases, the level 16 within the tube also decreases, as well as the corresponding column pressure. In an exemplary embodiment, the sensing tube 60 has a cylindrical chamber configuration, with an inner diameter of ⅝ inch, although other sizes and shapes can alternatively be employed.

The system 50 includes a means responsive to the changes in column pressure to provide an indication of the level 14 of the liquid 12 within the reservoir 10. In an exemplary embodiment, the means may be provided by a head unit 100, which includes a bellows 120 having an input stem 122, a bellows expansion body portion 124, and a distal bellows face surface 126. The bellows thus provides a chamber whose volume varies with the pressure applied to the input stem 122. The only opening to the bellows chamber is provided by the input stem. The input stem is coupled to the tube 60 by a connection tube system 70 which may run from a connector end 64 of the tube 60 to the head unit 100. The length of the connection tube system may vary, depending on the requirements of a given application. In an exemplary embodiment, the connection tubing system includes a flexible tubing section fabricated of an air-impermeable plastic material. In an exemplary embodiment, the tubing section may be a length of tubing marketed as Weatherhead 4 mm MTP16004NA-100, although other tubing sections of different dimensions may alternatively be employed. The tubing system may include push-together plastic tubing connectors, in which an end of a plastic tubing section is inserted into the connector and engages in an air-tight seal, e.g. with an o-ring included in the connector.

The bellows 120 in an exemplary embodiment is fabricated of a metal such as bronze, and has a "memory" tending to return the face surface 126 to a home position in the absence of a positive or negative relative pressure in the bellows body portion, i.e. relative to ambient atmospheric pressure. The position of the bellows face surface 126 is movable linearly along axis 128 in response to changes in the column pressure in the tube 60. The input stem 126 may be a rigid tubular portion, having exterior threads formed on the exterior surface to facilitate airtight coupling to the connector tubing structure 70. In an exemplary embodiment, the bellows 120 may be adapted to provide a linear travel range of 0.050 inch over a column pressure range between a column pressure associated with a reservoir "empty" condition and a column pressure associate with a reservoir "full" condition. This linear travel range may vary depending on other parameters of the liquid level sensor system.

In an exemplary embodiment, the head 100 further provides a mechanism to convert the linear movement of the bellows face surface 126 into a rotary movement. This may provide a rotary dial readout function indicating the level of liquid in the reservoir. In an exemplary embodiment, the linear-to-rotary movement conversion may be provided by a sector gear movement 140, discussed more fully below. In an exemplary embodiment, the head 100 includes a dial plate 110 and a dial face 110A having indicia noted thereon indicative of a range of liquid levels, e.g. ranging from "E" or empty to "F" or full. A dial indicator pointer 112 (FIG. 2) rotates on a rotatable hub 142 supported in the sector gear movement.

It will be appreciated that the head 100 may be mounted at a suitable location, which may be remote from the reservoir 10. The mounting location may be an instrument dashboard in a vehicle, boat, ship or airplane, for example. Or it could be mounted at a convenient monitoring location in a service station, in the case in which the reservoir is a fuel reservoir.

Figure 3:
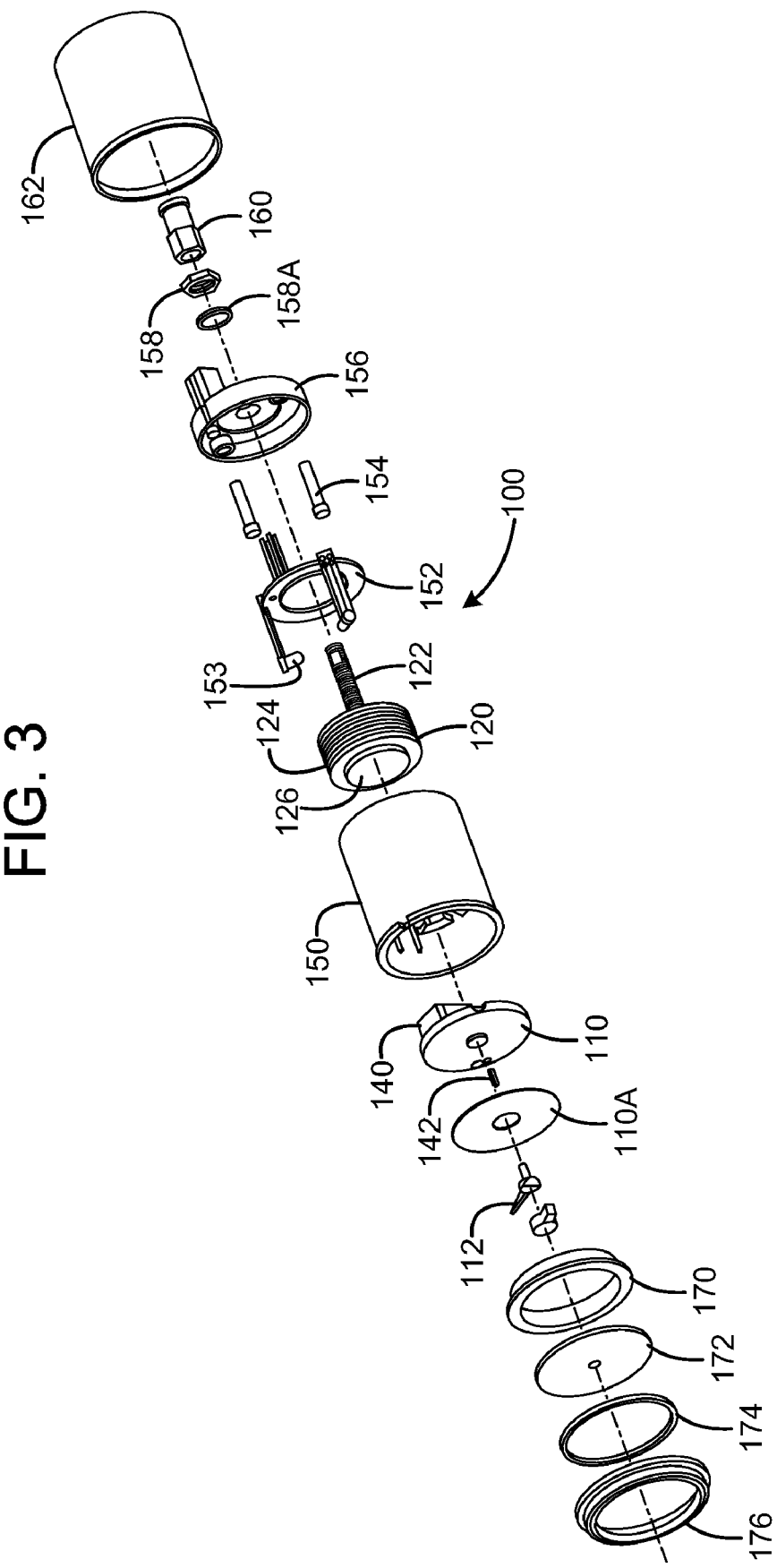
FIG. 3 is an exploded isometric view of an exemplary embodiment of a sensor head component for the liquid level sensor of FIG. 1.
Figure 4:
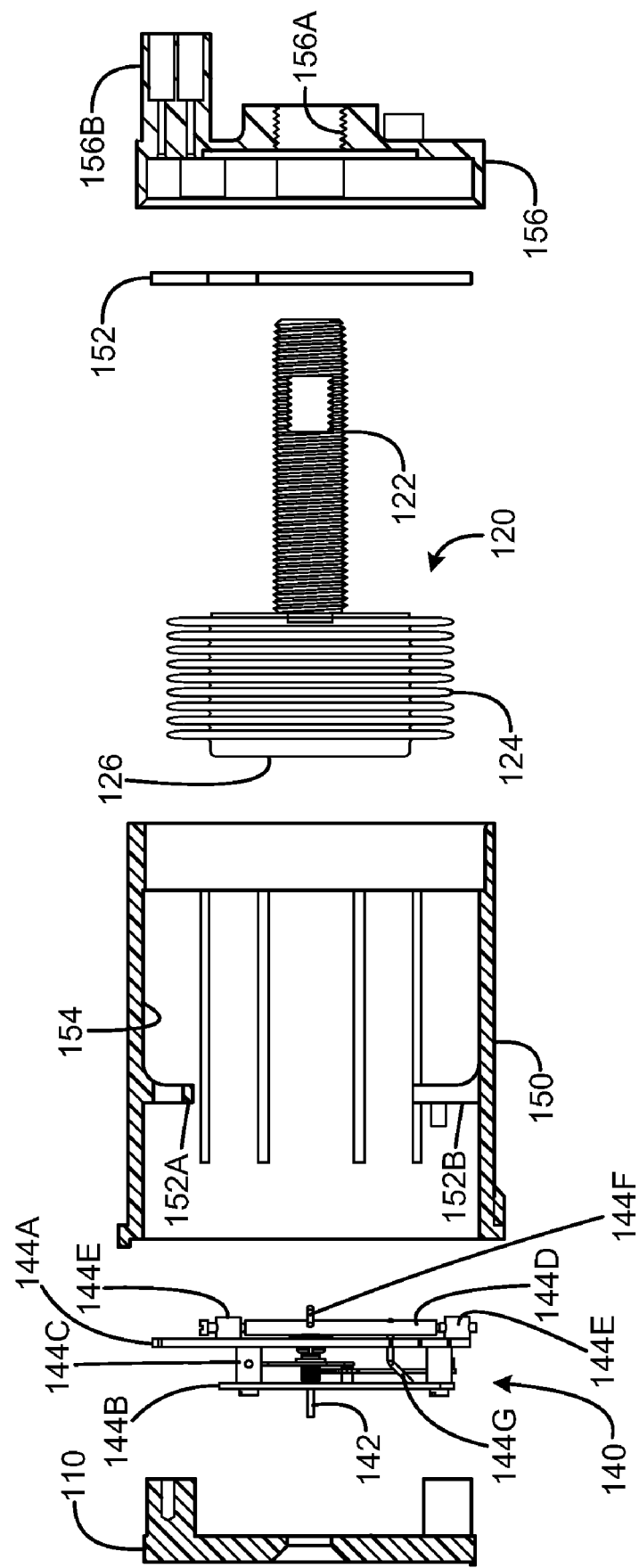
FIG. 4 is an exploded side view of components of an exemplary embodiment of a sensor head assembly for a liquid level sensor.

FIGS. 3 and 4 are exploded views of components of an exemplary embodiment of a sensor head unit 100. The head assembly includes a housing 150, of a generally cylindrical outer configuration, which supports the sector gear movement 140. The dial plate 110 is carried by the sector gear movement, and the dial 110A is mounted on the dial plate. Dial pointer 112 is mounted on hub pin 142. The dial may be protected from the elements by a mask 170, glass cover 172, gasket 174 and bezel 174. The head unit 100 further includes a base structure 156 which includes a threaded center opening 156A, which is adapted to receive the input stem 126 in a threaded engagement. The base structure 156 may be press fit into an end of the housing 150, in an exemplary embodiment. A nut 158 with lock washer 158A may engage the threads of the input stem to fix the axial location of the bellows at a given location. The base structure 156 includes bores through which threaded bolts 154 pass, to be used to attach the head unit to a mounting location, e.g. within outer housing 162 which may be mounted in a dashboard or other mounting location. The bolts 154 may pass through openings in the outer housing, and be secured with thumbscrews, in an exemplary embodiment. A fitting 160 is threaded onto the end of the input stem 126 of the bellows 120 and includes an adaptor to which the connection tubing system 70 may be attached.

In an exemplary embodiment, the head unit 100 may optionally include a printed circuit board 152 to which are attached LED assemblies 153 for provide dial illumination. A connector may be attached at 156B (FIG. 4).

Figure 1:
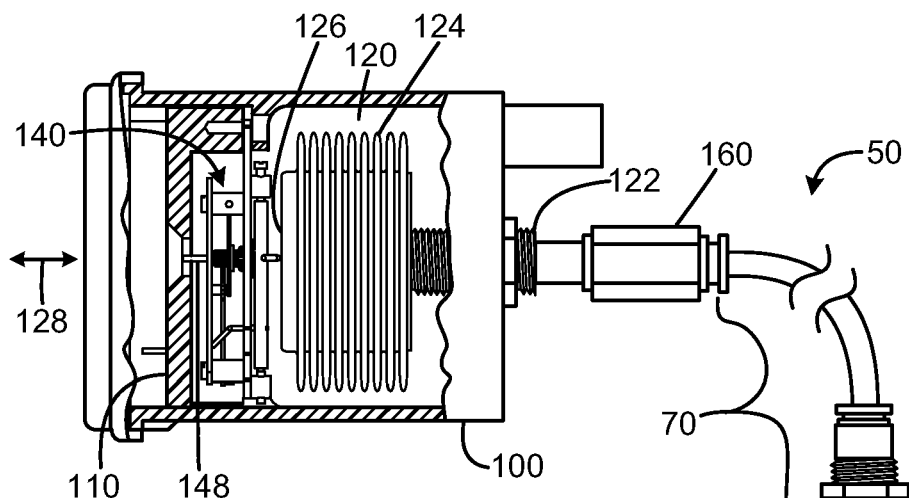
FIG. 1 is a diagrammatic partially broken-away side view illustrating an exemplary embodiment of a liquid level sensor system.
Figure 1:
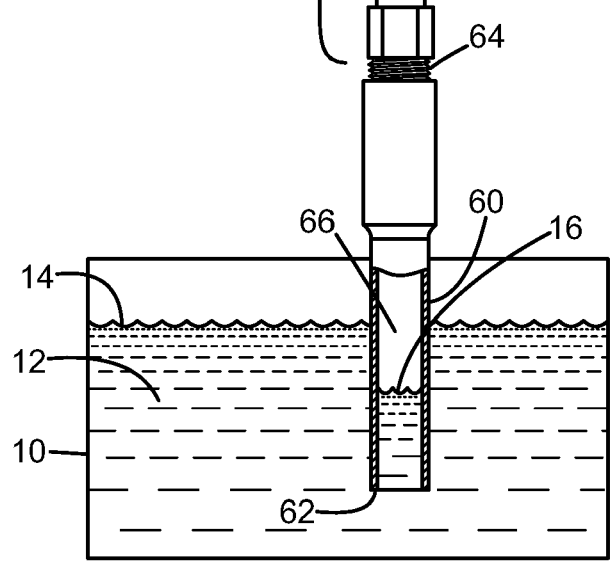
Figure 5:
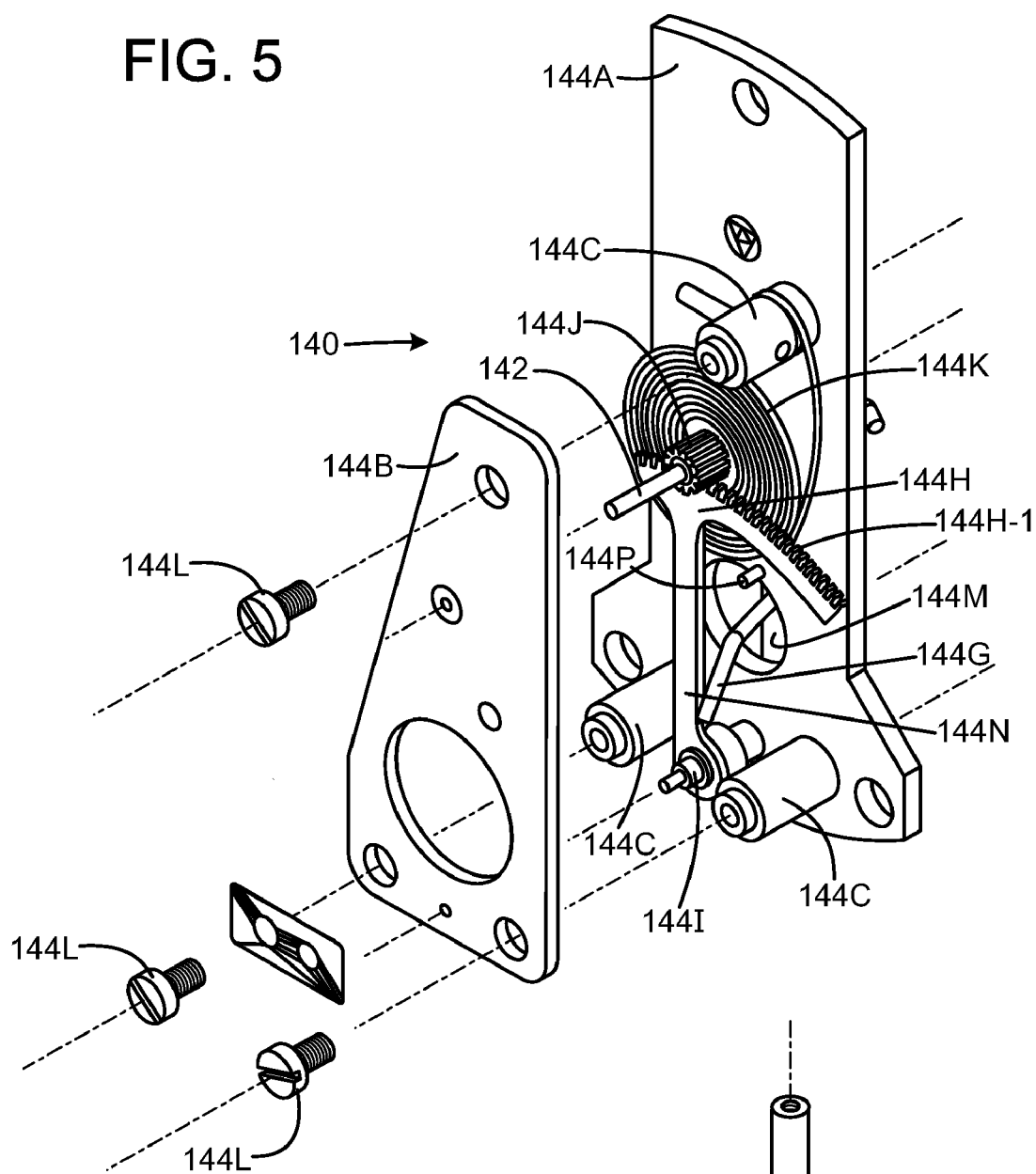
FIG. 5 is an exploded isometric view of an exemplary embodiment of a sector gear movement for the liquid level sensor system of FIG. 1.

An exemplary embodiment of the sector gear movement 140 is illustrated in FIGS. 1 and 4, and in the exploded view of FIG. 5. The sector gear movement 140 includes a base plate member 144A and a top plate member 144B supported in a spaced relation relative to the base plate by standoff posts 144C. The sector gear movement 140 may be assembled into the housing 150, with the base plate 144A supported on shoulder tabs 152A, 152B protruding from the inner wall 14 of the housing structure. The sector gear movement 140 with the dial plate 110 may be captured in place by the mask 170 and bezel 174 with the head unit in an assembled condition.

Figure 6:
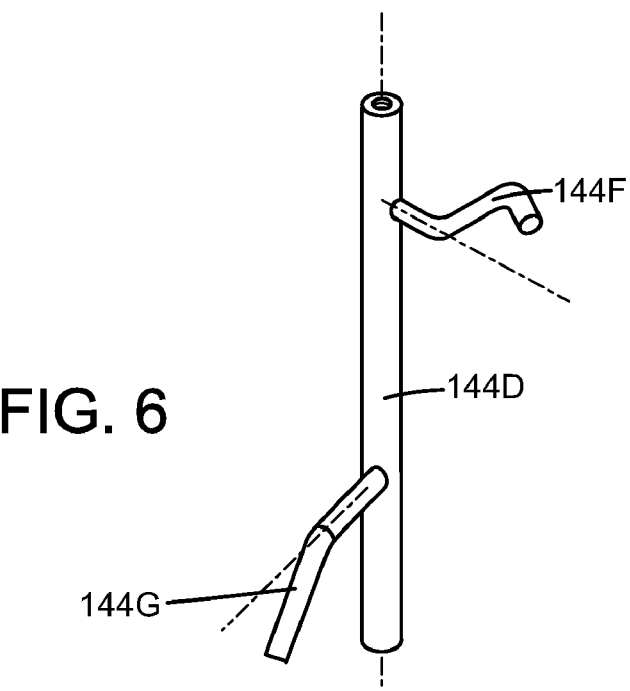
FIG. 6 is an isometric view of an exemplary embodiment of an actuating rod included in the sensor head assembly of FIG. 4.

The sector gear movement 140 includes a rod 144D mounted on pivots 144E to the back side of the base plate 144A for rotational movement. FIG. 6 illustrates an exemplary embodiment of the rod 144D. The rod 114D has a first lever 144F attached at a generally central location, with a dogleg tip formed therein, and angled toward the bellows face surface 126. The dogleg tip of the lever 144F is adapted to be in contact with the bellows face surface 126 during operation, such that linear motion of the bellows face surface results in rotational movement of the rod 144D. The rod 144D also has a second lever 144G attached at a location offset from the generally central location of the first lever 144F. The second lever 144G may have a dogleg configuration as well, with a tip extending through an opening 144M in the base plate 144A.

The tip of the second lever 144G is adapted to contact a web portion 144N of sector gear 144H, causing the sector gear to rotate about pivot mount 144I as rod 144D is rotated.

The exemplary embodiment of the sector gear movement 140 includes a pinion gear 144J mounted on dial pin 142 for rotational movement with the dial pin. Teeth of the pinion gear are in engagement with teeth 144H-1 of the sector gear 144H, such that rotation of the sector gear about its mount 144I results in rotation of pinion gear 144J and dial pin 142. The gear ration between the pinion gear 144J and the sector gear 144H may be selected to provide a desired travel range of movement of the dial pin 142 for a given rotational movement of the sector gear. A bias spring 144K is connected between a stationary post 144C and the pin 142 to bias the pin to a given home position, which may be registered by a pin 144P stopping counterclockwise movement of the sector gear web 144N. The arrangement of the sector gear, the pinion gear, and the levers 144F and 144G may be selected so as to provide a relatively large dial point movement for a relatively small travel distance of the bellows face 126. In one exemplary embodiment, the arrangement may be selected to provide a 270 degree rotation of the dial pin 142 for a range of movement of the bellows face of about 0.050 inch, although this is merely one exemplary embodiment. The travel distance of the face of the bellows may depend on the spring constant of the bellows as well.

An exemplary embodiment of the liquid level sensing system may be calibrated or adjusted to provide accurate sensor readings. One adjustment for the embodiment illustrated in FIGS. 1-6 is the location of the bellows 120 within the housing 150. This location may varied by turning the bellows so that the stem advances or retracts within the threaded opening 156A. Once the desired location of the bellows face surface 126 has been obtained, the bellows may be locked in position by tightening the locking nut 158 against the lock washer and the base structure 156. Another adjustment may be to bend the pin lever 144F to vary its position relative to the bellows face surface 126. Another adjustment may be to bend the pin lever 144G to vary its position relative to the sector gear web. Bending a pin lever may be done by use of pliers, for example. In an exemplary embodiment, the head may be adjusted so that the dial needle with be at a zero or empty position with a relative column pressure equal to the ambient pressure.

Figure 8:
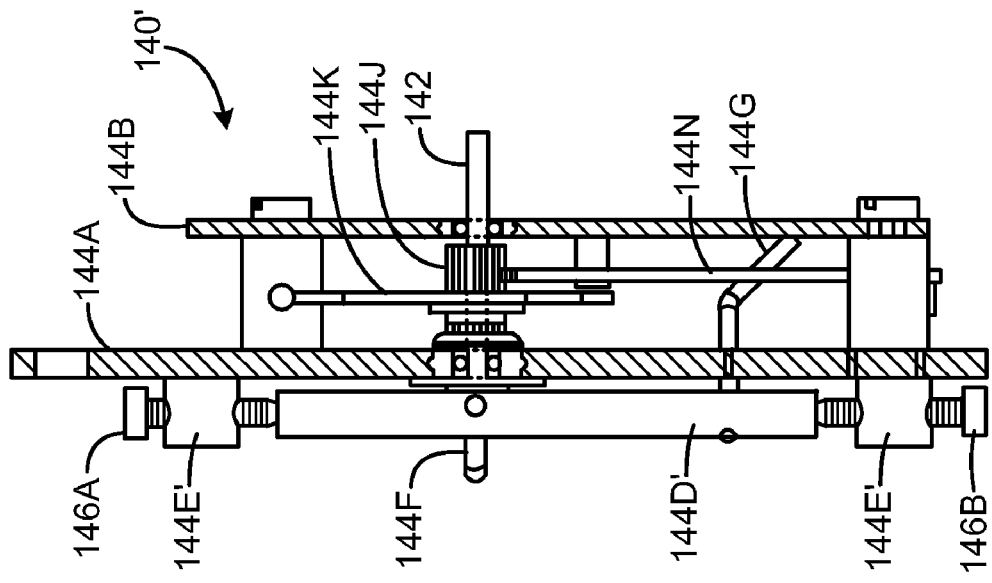
FIG. 8 is a side view of the sector gear movement of FIG. 7.
Figure 7:
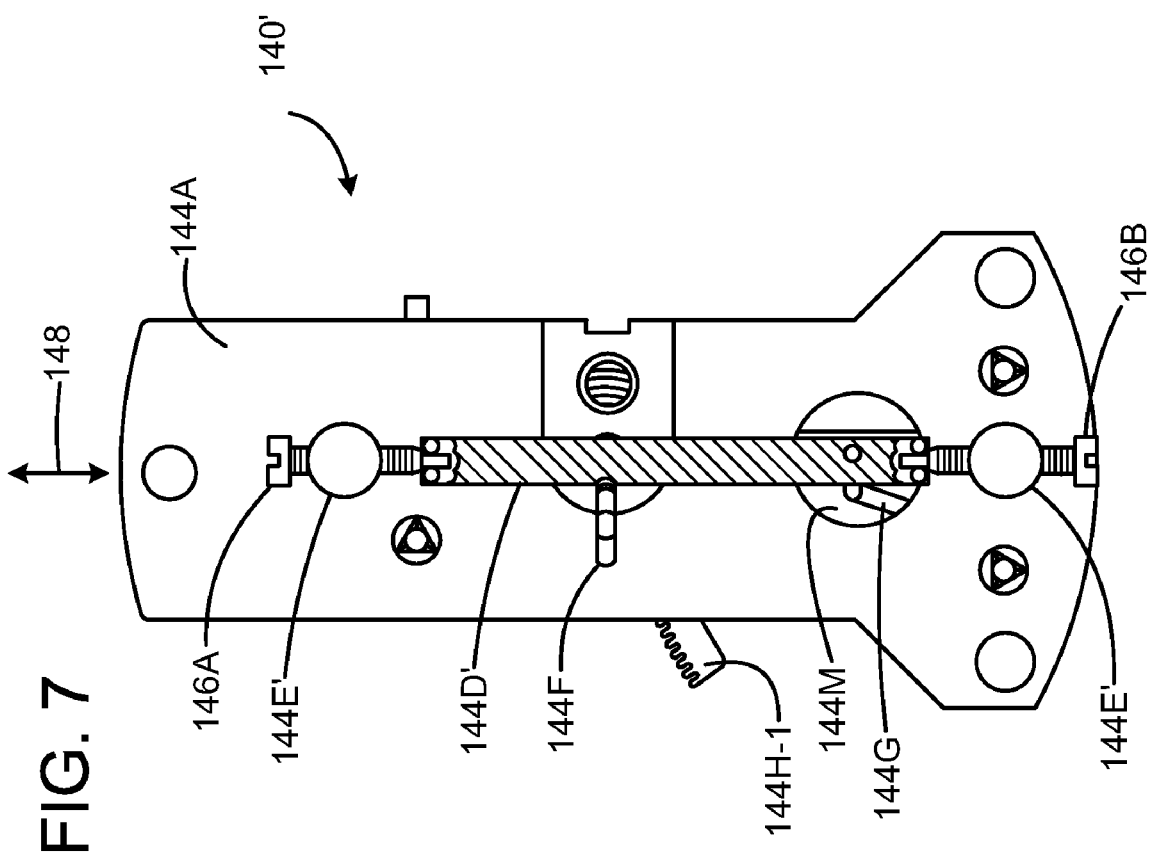
FIG. 7 is a plan view of an alternate embodiment of a sector gear movement.

An alternate embodiment of a sector gear movement 140' is illustrated in FIGS. 7-8. This embodiment is identical to the sector gear movement 140 depicted, e.g., in FIGS. 4-6, except that the rod 140D' is mounted for axial movement, depicted by arrow 148, to provide an adjustment or calibration function. In this exemplary embodiment, the rod is mounted between pivots 144E' by threaded pins 146A, 146B, which have end tips received in bores or openings formed in the opposed ends of the rod 144D'. (This differs from the embodiment depicted in FIGS. 4-6, in which the rod 140D is mounted using one threaded pin on one end and a fixed pin on the other.) By turning the threaded pins 146A, 146B in tandem, the position of the rod 144E1 can be shifted along the direction of arrows 148. By moving the rod, the position of the lever 144G also shifts, and comes into contact with the sector gear web 144N at different positions, with the web 144N disposed at an angle with respect to the rod 144D', thus affecting the position of the sector gear and dial point. This adjustment can be used in calibrating the sensor. The amount of axial adjustment travel may be relatively small, e.g. +/−0.050 inch in an exemplary embodiment, although this will vary in dependence on the parameters of the sector gear movement. This adjustment may be used instead of, or in addition to, bending the lever 144G.

Figure 9:
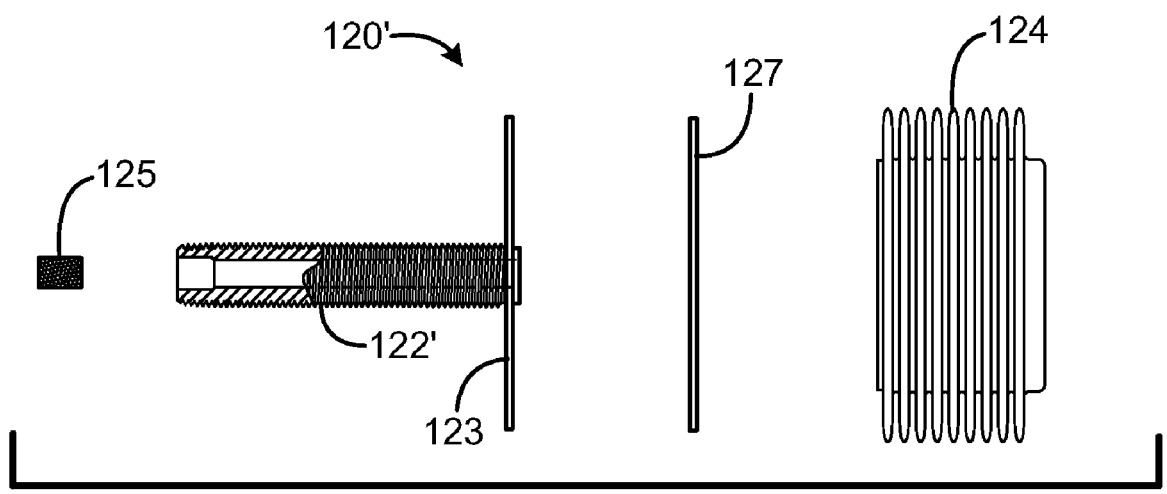
FIG. 9 is an exploded side view of an exemplary alternate embodiment of a bellows assembly for a sensor head assembly.
Figure 10:
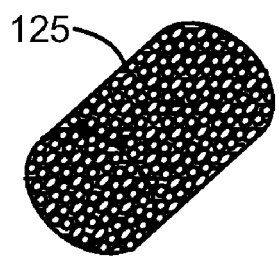
FIG. 10 is an isometric view of a flow restrictor for the bellows assembly of FIG. 9.

Features of an alternate embodiment of a liquid level sensor are depicted in FIGS. 9 and 10. This embodiment is similar to the embodiments of FIGS. 1-8, except that a flow restrictor 125 is introduced in the air column to dampen instantaneous fluctuations in the air column pressure due to vibrations and other sensor noise. This reduces or eliminates rapid movements or quivering of the sensor indicator dial pointer due to such instantaneous fluctuations, while passing steady state column pressure accurately to the bellows 124.

In the exemplary embodiment of FIGS. 9-10, the flow restrictor 125 is positioned inside the hollow input stem 122', which may have an inner diameter of 0.135 inch in an exemplary embodiment. One end of the input stem is attached to an end cap 123, which is in turn attached to the bellows 124 by a solder ring 127 in an exemplary embodiment. The flow restrictor 125 may be positioned in the input stem at its distal end from the bellows, with the inner diameter enlarged over an end region of the input stem. In an exemplary embodiment, the end region may have an inner diameter of 0.152 inch, with a step shoulder defined in the hollow input stem. The flow restrictor 125 may be pressed into the end of the stem, until it reaches the step shoulder.

An exemplary flow restrictor suitable for the purpose is a sintered metal restrictor element, e.g. bronze, having an outer diameter equal to the inner diameter of the input stem 122', and a length on the order of 0.182 inch. An exemplary restrictor element is a rigid structure formed of very small sintered bronzed spheres or balls. In an exemplary embodiment, the spheres may be of a powder grain size. The size of the spheres and density of the restrictor structure may be selected to provide a suitable dampening effect on sudden spikes or decreases in the column pressure, while allowing steady state column pressure to be transmitted through the restrictor to the bellows.

In other embodiments, the flow restrictor may be placed at other locations in the sensor air column, e.g. within the flexible tubing portion of the tube system 70 or in the tube 60 (see FIG. 1).

Exemplary embodiments of a liquid level sensor may be used, for example, to monitor lubricating oil levels in engine crankcases or oil sumps, fuel levels in fuel tanks of vehicles such as cars, trucks and aircraft, as well as fuel levels in marine applications such as ships and boats. In an exemplary embodiment, the sensor system is actuated by column pressure in the tube, and is not electrically actuated. In an exemplary embodiment, the particulars of the bellows and the sector gear movement used for a given application may be selected based on the parameters of the application, such as the type of liquid whose level is being sensed, the capacity of the liquid reservoir, the difference in the empty level and a full level in the reservoir, and the like. By way of example, the difference in an empty level and a full level for an engine crankcase in a truck engine may be on the order of 5 to 6 inches for one type of engine. The stiffness of the bellows and the gear ratio of the sector gear may be selected to provide a range of movement of the dial pointer between an empty indication and a full indication for a difference in column pressure caused by the 5 to 6 inch differential height of the liquid level in the reservoir. The same sector gear movement may be used for several different applications, with different bellows being selected to accommodate variations in the particular application. Other applications, such as a vehicle fuel tank sensor or a service station tank, may have larger or smaller differential levels between an empty and a full level, and the liquid level sensor components may be selected to provide an accurate level indication for such applications as well.

Although the foregoing has been a description and illustration of specific embodiments of the invention, various modifications and changes thereto can be made by persons skilled in the art without departing from the scope and spirit of the invention as defined by the following claims.

What is claimed is:

1. A liquid level sensor, comprising:
   a hollow member having a distal open end adapted to be positioned into a liquid reservoir to a depth below a liquid surface level, the distal open end of the hollow member allowing liquid to enter the tube to an equilibrium level dependent on the volume of liquid in the liquid reservoir;
   a sensor head unit configured for mounting at a head mount location remote from the liquid reservoir;
   a connection tubing system adapted to provide a closed fluid conduit between the hollow member at the liquid reservoir and the sensor head unit at the head mount location, such that an air column pressure in said hollow member dependent on said equilibrium level is transmitted to the sensor head unit;
   said sensor head unit comprising a non-electrically powered system for providing an indication of a position of said liquid surface level, said system including:
      a bellows member having an input stem portion adapted for connection to the connection tubing system, an expandable body portion and a distal bellows face surface, the bellows body adapted for expansion and contraction in response to differential column pressure changes so that said bellows face surface translates along a range of movement, the bellows member mounted in a sensor head housing with external surfaces of the bellows member exposed to ambient atmospheric pressure;
      a mechanism responsive to movement of said bellows face surface to provide an indication of a position of said liquid surface level, said mechanism including a sector gear movement including a dial pin, a pinion gear mounted to said dial pin, and a sector gear responsive to said movement of said bellows face surface, said sector gear engaging said pinion gear to rotate said pinion gear and said dial pin in response to said movement of said bellows face surface; and
      a flow restrictor positioned to dampen instantaneous differential column pressure changes presented to the bellows member while permitting steady state column pressure to be communicated to the bellows member.

2. The sensor of claim 1, wherein the input stem portion is hollow, and the flow restrictor is positioned in the input stem portion.

3. The sensor of claim 1, wherein the flow restrictor is a sintered metal structure fabricated of small metal particles.

4. The sensor of claim 1, wherein said hollow member is a rigid tube, and said distal end is adapted to be positioned at a depth in the reservoir below a low or empty liquid level.

5. The sensor of claim 1, wherein said liquid is lubricating oil, and the reservoir is an engine crankcase or engine oil sump.

6. The sensor of claim 1, wherein said liquid is a fuel, and the reservoir is a fuel tank of a fuel station, a vehicle, an aircraft or a boat.

7. A liquid reservoir system, comprising:
   a reservoir for holding a volume of liquid;
   a hollow member having a distal open end adapted to be positioned into the liquid reservoir to a depth below a liquid surface level, the distal open end of the hollow member allowing liquid to enter the tube to an equilibrium level dependent on the volume of liquid in the reservoir;

a sensor head unit configured for mounting at a head mount location remote from the liquid reservoir;

a connection tubing system adapted to provide a closed connection between the hollow member at the reservoir and the sensor head unit at the head mount location, such that an air column pressure in said hollow member dependent on said equilibrium level is transmitted to the sensor head unit;

said sensor head unit mounted at a location remote from the reservoir, and comprising a sensor head housing and a non-electrically powered system for providing an indication of a position of said liquid surface level, said system including:

a bellows member having an input stem portion adapted for connection to the connection tubing system, an expandable body portion and a distal bellows face surface, the bellows body adapted for expansion and contraction in response to differential column pressure changes so that said bellows face surface translates along a range of movement, the bellows member mounted in the sensor head housing with external surfaces of the bellows member exposed to ambient atmospheric pressure;

a level indicating mechanism responsive to movement of said bellows face surface to provide an indication of a position of said liquid surface level; and a flow restrictor positioned to dampen instantaneous differential column pressure changes presented to the bellows member while permitting steady state column pressure to be communicated to the bellows member;

a mechanism configured to advance or retract the bellows member within the sensor head housing to adjust the location of a home position of the distal bellows face surface within the sensor head.

8. The reservoir system of claim 7, wherein said mechanism includes a sector gear movement including a dial pin, a pinion gear mounted to said dial pin, and a sector gear responsive to said movement of said bellows face surface, said sector gear engaging said pinion gear to rotate said pinion gear and said dial pin in response to said movement of said bellows face surface.

9. The reservoir system of claim 7, wherein said hollow member, and said distal end is positioned at a depth in the reservoir below a low or empty liquid level.

10. The reservoir system of claim 7, wherein said liquid is lubricating oil, and the reservoir is an engine crankcase or engine oil sump.

11. The reservoir system of claim 7, wherein said liquid is a fuel, and the reservoir is a fuel tank of a fuel station, a vehicle, an aircraft or a boat.

12. The reservoir system of claim 7, wherein said flow restrictor comprises a sintered bronze particle restrictor structure.

13. A liquid level sensor system, comprising:

a hollow sensing tube member having a distal open end adapted to be positioned into a liquid reservoir to a depth below a liquid surface level and a chamber, the distal open end of the hollow member allowing liquid to enter the tube chamber to an equilibrium level dependent on the volume of liquid in the reservoir;

a sensor head unit coupled to said hollow sensing tube member and responsive to an air column pressure in said chamber, said sensor head unit configured for mounting at a mount location remote from the liquid reservoir; said sensor head unit comprising a non-electrically powered system for providing an indication of a position of said liquid surface level, said system including:

a closed bellows member having an input stem portion adapted for coupling to the hollow sensing tube member so that said column pressure is transmitted to the closed bellows member, an expandable body portion and a distal bellows face surface, the bellows body adapted for expansion and contraction in response to column pressure changes so that said bellows face surface translates along a range of movement;

means responsive to movement of said bellows face surface to provide an indication of a position of said liquid surface level, said means responsive to movement of said bellows face surface including a sector gear movement, a rotatable member mounted for rotation adjacent said bellows face surface, a first lever extending from said rotatable member and positioned in contact with the bellows face surface so that movement of the bellows face surface causes motion of the first lever to rotate the rotatable member, and a second lever extending from said rotatable member and positioned to contact a sector gear member and rotate the sector gear as the rotatable member is rotated;

a connection system adapted to provide a closed fluid conduit between the hollow sensing tube member at the liquid reservoir and the sensor head unit at the mount location, such that said column pressure in said hollow member is transmitted to the sensor head unit; and fluid flow restrictor means positioned to dampen instantaneous differential column pressure changes presented to the bellows member while permitting steady state column pressure to be communicated to the bellows member.

14. The sensor system of claim 13, wherein said flow restrictor means comprises a sintered metal structure fabricated of small metal particles.

15. The sensor system of claim 13, wherein said hollow member comprises a first end disposed above the liquid surface level and connected to said connection tubing system, and said distal end is adapted to be positioned at a depth in the reservoir below a low or empty liquid level.

16. The sensor system of claim 13, wherein said liquid is lubricating oil, and the reservoir is an engine crankcase or engine oil sump.

17. The sensor system of claim 13, wherein said liquid is a fuel, and the reservoir is a fuel tank of a fuel station, a vehicle, an aircraft or a boat.

18. The sensor of claim 1, wherein the mount location is an instrument dashboard.

19. The sensor of claim 18, wherein the mount location is in a vehicle, boat, ship or airplane.

20. The sensor of claim 1, wherein the hollow member is a sensing tube which is configured for insertion into the liquid reservoir, comprising a first end above the liquid surface level and said distal open end, said first end configured for connection to said connection tubing system.

21. The sensor of claim 7, wherein the mount location is an instrument dashboard.

22. The sensor of claim 21, wherein the mount location is in a vehicle, boat, ship or airplane.

23. The sensor of claim 13, wherein the mount location is an instrument dashboard.

24. The sensor of claim 23, wherein the mount location is in a vehicle, boat, ship or airplane.

* * * * *